(12) United States Patent
Ohki

(10) Patent No.: US 12,216,232 B2
(45) Date of Patent: Feb. 4, 2025

(54) ARITHMETIC PROCESSING APPARATUS, DISTANCE MEASURING APPARATUS, AND ARITHMETIC PROCESSING METHOD

(71) Applicant: Sony Semiconductor Solutions Corporation, Kanagawa (JP)

(72) Inventor: Mitsuharu Ohki, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 955 days.

(21) Appl. No.: 17/286,685

(22) PCT Filed: Jul. 23, 2019

(86) PCT No.: PCT/JP2019/028872
§ 371 (c)(1),
(2) Date: Apr. 19, 2021

(87) PCT Pub. No.: WO2020/084851
PCT Pub. Date: Apr. 30, 2020

(65) Prior Publication Data
US 2021/0349195 A1 Nov. 11, 2021

(30) Foreign Application Priority Data
Oct. 25, 2018 (JP) ................................. 2018-200617

(51) Int. Cl.
*G01S 7/497* (2006.01)
*G01C 3/08* (2006.01)
(Continued)

(52) U.S. Cl.
CPC ................ *G01S 7/497* (2013.01); *G01C 3/08* (2013.01); *G01S 17/26* (2020.01); *G01S 17/89* (2013.01)

(58) Field of Classification Search
USPC ........................................................ 356/5.01
See application file for complete search history.

(56) References Cited

U.S. PATENT DOCUMENTS

2003/0223053 A1* 12/2003 Liu ..................... G01S 7/493
356/5.1
2012/0013887 A1* 1/2012 Xu ..................... G01S 17/894
356/4.02
(Continued)

FOREIGN PATENT DOCUMENTS

CN 1283264 A 2/2001
CN 101806897 A 8/2010
(Continued)

OTHER PUBLICATIONS

International Search Report (PCT/ISA/210), International Application No. PCT/JP2019/028872, dated Sep. 13, 2019.
(Continued)

*Primary Examiner* — James R Hulka
(74) *Attorney, Agent, or Firm* — Michael Best & Friedrich LLP

(57) ABSTRACT

It is an object of the present technology to acquire distance measurement data having the maximum likelihood value by performing appropriate noise reduction. For this object, an arithmetic processing apparatus according to the present technology includes an operation processing part that performs processing of: calculating a first distance to a measurement object by emitting and receiving first irradiation light of which intensity is modulated by a first modulation signal of a first frequency; calculating a second distance to the measurement object by emitting and receiving second irradiation light of which intensity is modulated by a second modulation signal of a second frequency different from the first frequency; calculating a corrected first distance using first correction data that has been acquired; and determining the corrected first distance within an error range of the second distance as a third distance using the second distance.

14 Claims, 5 Drawing Sheets

(51) Int. Cl.
*G01S 17/26* (2020.01)
*G01S 17/89* (2020.01)

(56) References Cited

U.S. PATENT DOCUMENTS

| 2016/0086318 | A1 | 3/2016 | Hannuksela |
| 2018/0011195 | A1 | 1/2018 | Perry et al. |
| 2018/0218509 | A1 | 8/2018 | Price et al. |

FOREIGN PATENT DOCUMENTS

| CN | 102346248 | A | | 2/2012 | |
| CN | 104160243 | A | | 11/2014 | |
| CN | 106707290 | A | | 5/2017 | |
| EP | 2593810 | B1 | * | 3/2016 | ............. G01S 17/89 |
| JP | 2006-201037 | A | | 8/2006 | |
| JP | 2007-526448 | A | | 9/2007 | |
| JP | 2013-534639 | A | | 9/2013 | |
| WO | 2017/022152 | A1 | | 2/2017 | |

OTHER PUBLICATIONS

Notification of Transmittal of the International Search Report and the Written Opinion of the International Searching Authority, or the Declaration (PCT/ISA/220), International Application No. PCT/JP2019/028872, dated Sep. 24, 2019.

Written Opinion of the International Search Authority (PCT/ISA/237), International Application No. PCT/JP2019/028872, dated Sep. 24, 2019.

Jia Fangxiu "Phase-shift laser range finder receiver system", Optics and Precision Engineering, Oct. 15, 2009, pp. 2377-2384, vol. 17, No. 10.

* cited by examiner

ARITHMETIC PROCESSING APPARATUS, DISTANCE MEASURING APPARATUS, AND ARITHMETIC PROCESSING METHOD

TECHNICAL FIELD

The present technology relates to a technical field of an arithmetic processing apparatus that measures a distance to a measurement object by emitting light of irradiation light and receiving reflected light that is the irradiation light reflected by the measurement object, a distance measuring apparatus, and an arithmetic processing method.

BACKGROUND ART

One of methods for measuring distance is called time of flight (ToF). In the ToF, a distance to a measurement object is measured by irradiating the measurement object with irradiation light whose intensity is periodically changed so that the intensity change forms a sine wave, and receiving reflected light. Specifically, the distance to the measurement object is measured by measuring a phase difference between the irradiation light and the reflected light received while synchronizing with the irradiation light.

A light receiving sensor that receives the reflected light includes pixels arranged in a two-dimensional array. Each pixel has a light receiving element and can take in light. Furthermore, each pixel can acquire phase and amplitude of the received sine wave by receiving light while synchronizing with the light emission of the irradiation light. Note that the phase reference is a sine wave of the irradiation light.

The phase acquired by each pixel corresponds to the time until the irradiation light emitted from the light emitting part is reflected by the measurement object and input to the light receiving sensor. Therefore, by dividing the phase by $2\pi f$ ($\pi$: pi, f: the frequency of the sine wave used for intensity modulation), multiplying the division result by the light speed (c: about 300,000 km/s), and dividing the multiplication result by 2 (in order to convert reciprocating distance to one-way distance), the distance to the object imaged in the pixel is calculated.

The distance measurement data acquired by the method described above is considered to include noise. Accordingly, by performing noise reduction, it is possible to correct the data to correct distance measurement data. For example, Patent Document 1 discloses a technology using averaging processing and median filter processing as an example of noise reduction.

CITATION LIST

Patent Document

Patent Document 1: WO2017/022152

SUMMARY OF THE INVENTION

Problems to be Solved by the Invention

However, in noise reduction using averaging processing or median filter processing, the effect of noise reduction can be obtained in a case where pieces of distance data in the neighboring pixels are the same, but the effect of noise reduction cannot be obtained in other cases.

Therefore, it is an object of the present technology to acquire distance measurement data having the maximum likelihood value by performing appropriate noise reduction.

Solutions to Problems

An arithmetic processing apparatus according to the present technology includes an operation processing part that performs processing of: calculating a first distance to a measurement object by emitting and receiving first irradiation light of which intensity is modulated by a first modulation signal of a first frequency; calculating a second distance to the measurement object by emitting and receiving second irradiation light of which intensity is modulated by a second modulation signal of a second frequency different from the first frequency; calculating a corrected first distance using first correction data that has been acquired; and determining the corrected first distance within an error range of the second distance as a third distance using the second distance.

Of the distances measured by two types of light modulated by two modulation signals having different frequencies, one is regarded as information having excellent distance resolution and the other is regarded as information having excellent distance measuring range.

In the arithmetic processing apparatus according to the present technology described above, the first correction data may be data for correcting an error of a measurement distance caused by an error in the intensity change of the first irradiation light with respect to the sine wave of the first frequency.

The first distance is considered to include an error due to the fact that the intensity change of the first irradiation light does not form an accurate sine wave.

In the arithmetic processing apparatus according to the present technology described above, the first frequency may be a higher frequency than the second frequency.

Of the light of which intensity is modulated by the first modulation signal (first irradiation light) and the light of which intensity is modulated by the second modulation signal (second irradiation light), the distance measurement result using the first irradiation light in which the error for an accurate sine wave can be corrected is more suitable for measuring an accurate distance. Furthermore, since the second irradiation light has a lower frequency than the first irradiation light, the distance measuring range is excellent.

In the arithmetic processing apparatus according to the present technology described above, the third distance may be considered to include an error due to noise, and the arithmetic processing apparatus may further include processing of: acquiring second correction data for correcting an error of the second distance caused by an error in an intensity change of the second irradiation light with respect to a sine wave of the second frequency; defining a corrected second distance obtained by correcting the second distance using the second correction data; defining a difference between the corrected first distance and the third distance as a first difference, defining a difference between the corrected second distance and the third distance as a second difference; and calculating an error due to the noise so that the first difference and the second difference become smaller.

The third distance includes not only an error that can be corrected by the first correction data, that is, an error due to the fact that the intensity change of the first irradiation light does not form an accurate sine wave, but also an error due to the noise component such as natural light entering the light receiving part during distance measurement (error due to noise). In order to acquire an appropriate distance measurement result in consideration of the error due to noise, the second correction data for correcting the error of the second distance due to the fact that the intensity change of the second irradiation light includes an error with respect to the sine wave is calculated, and moreover, an error due to noise is appropriately calculated from the difference of the third distance with each of the corrected first distance and the corrected second distance.

In the arithmetic processing apparatus according to the present technology described above, the second correction data may be defined by a correction function approximated by a second-order Taylor series expansion.

By expressing the second correction data with a correction function approximated by the second-order Taylor series expansion, it is not necessary to perform measurement in advance.

In the arithmetic processing apparatus according to the present technology described above, the error of the third distance may be calculated so that the second difference becomes smaller for a neighboring pixel in spatiotemporal space with respect to a pixel of interest.

In order to correct the error of the third distance for the pixel targeted for distance measurement (that is, the pixel of interest), each coefficient of the approximate expansion is calculated so that not only the first difference and the second difference of the pixel of interest, but also a first difference and a second difference of neighboring pixel in the spatiotemporal space of the pixel of interest become smaller.

In the arithmetic processing apparatus according to the present technology described above, the neighboring pixel may be a pixel that has been extracted under a condition that the difference between the second distance before correction for the pixel of interest and the second distance before correction for the neighboring pixel is equal to or less than a predetermined threshold.

As a result, even for a neighboring pixel of the pixel of interest, a neighboring pixel of which the third distance before correction is deviated by a predetermined threshold or more is not used for calculation (that is, calculation of a correction value for correcting the third distance)of the error of the third distance.

A distance measuring apparatus according to the present technology includes: a light emitting part capable of light emission of first irradiation light of which intensity is modulated by a first modulation signal of a first frequency, and light emission of second irradiation light of which intensity is modulated by a second modulation signal of a second frequency different from the first frequency; a light receiving part that receives reflected light that is light emitted from the light emitting part and reflected by a measurement object; and an operation processing part that performs processing of calculating a first distance to a measurement object by emitting and receiving first irradiation light, calculating a second distance to the measurement object by emitting and receiving second irradiation light, calculating a corrected first distance using first correction data that has been acquired, and determining the corrected first distance within an error range of the second distance as a third distance using the second distance.

Pieces of irradiation light whose intensity is modulated at different frequencies can be emitted and each reflected light reflected by the measurement object can be received, and therefore, two pieces of distance measurement data with different distance resolution and distance measurement range can be acquired. It is possible to calculate the third distance as the measurement distance from these two distance measurement data.

The distance measuring apparatus according to the present technology described above may include a storage part in which the first correction data is stored.

By storing the first correction data in the storage part, it is not necessary to communicate with the outside in the correction processing of the first distance.

An arithmetic processing method according to the present technology includes: calculating a first distance between a distance measuring apparatus and a measurement object by emitting and receiving light of which intensity is modulated by a first modulation signal of a first frequency; calculating a second distance between the distance measuring apparatus and the measurement object by emitting and receiving light of which intensity is modulated by a second modulation signal of a second frequency different from the first frequency; calculating a corrected first distance using first correction data that has been acquired; and determining the corrected first distance within an error range of the second distance as a third distance using the second distance.

Of the distances measured by two types of light modulated by two modulation signals having different frequencies, one is regarded as information having excellent distance resolution and the other is regarded as information having excellent distance measuring range.

MODE FOR CARRYING OUT THE INVENTION

Figure 1:
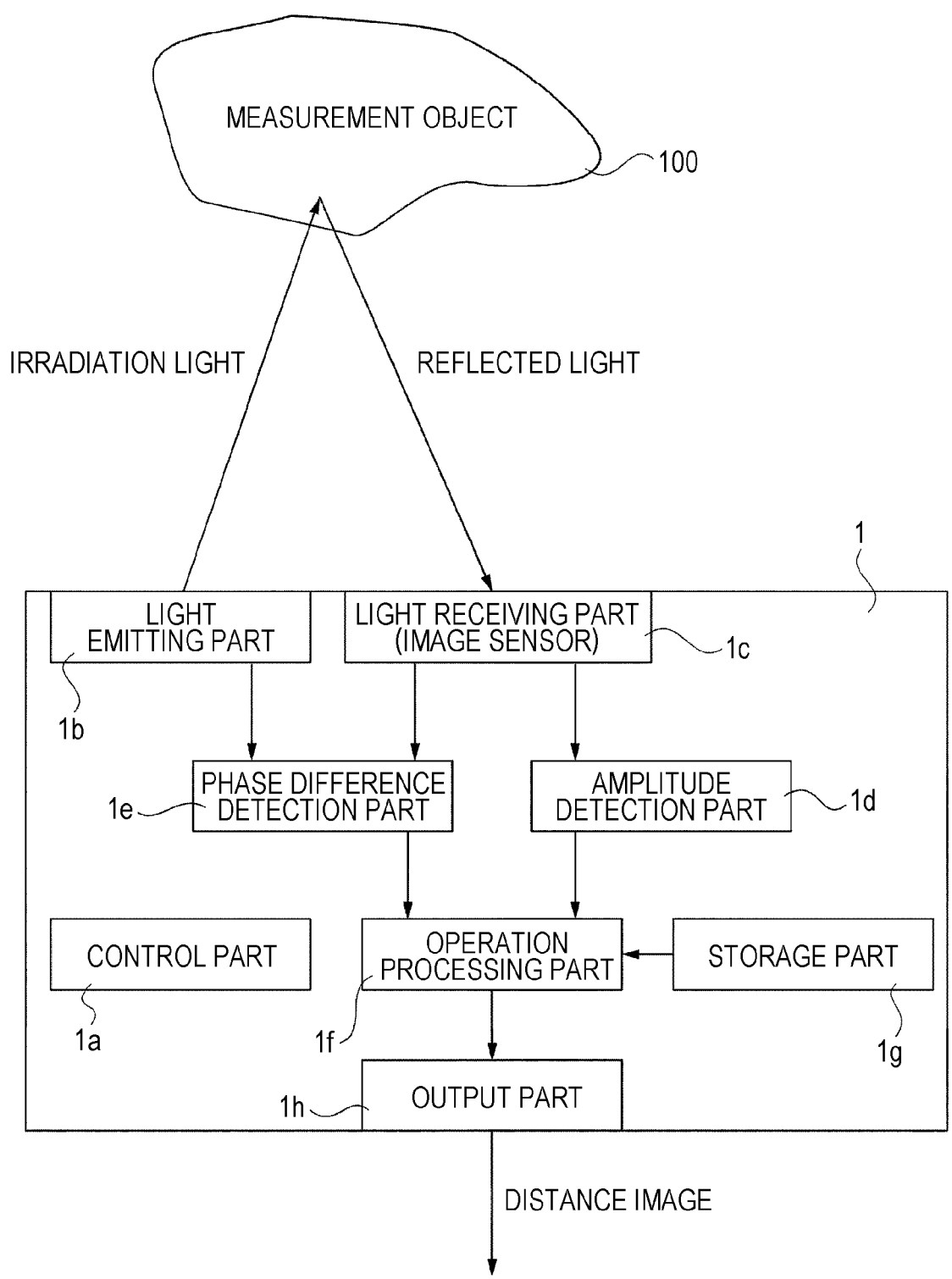
FIG. 1 is a diagram showing a system configuration of a distance measuring apparatus according to an embodiment of the present technology.

Hereinafter, embodiments will be described in the following order.

<1. Configuration of distance measuring apparatus>
<2. Irradiation light and reflected light>
<3. Embodiment>
<3-1. Pre-measurement of correction value>
<3-2. Correction of distance measurement data>
<3-3. Processing flow>
<4. Conclusion>

<1. Configuration of Distance Measuring Apparatus>

A configuration of a distance measuring apparatus $1$ will be described. Note that the distance measuring apparatus $1$ described here is just an example of an embodiment in which the present technology can be implemented.

The distance measuring apparatus $1$ includes a control part $1a$, a light emitting part $1b$, a light receiving part $1c$, an amplitude detection part $1d$, a phase difference detection part $1e$, an operation processing part $1f$, a storage part $1g$, and an output part $1h$.

The control part $1a$ can control each part of the light emitting part $1b$, the light receiving part $1c$, the amplitude detection part $1d$, the phase difference detection part $1e$, the operation processing part $1f$, the storage part $1g$, and the output part $1h$ by generating a control signal.

The light emitting part $1b$ emits irradiation light whose intensity is modulated so that the intensity change forms a sine wave on the basis of a drive signal of a predetermined frequency supplied by the control part $1a$. That is, if the change with time of the light intensity of the irradiation light is represented by a graph, it becomes a sine wave. In the description hereinafter, the light modulated so that the intensity change forms a sine wave of 10 MHz is described as "light of 10 MHz" or the like.

Note that, in the present embodiment, the light emitting part 1b is capable of emitting irradiation light having two types of frequencies. For example, the frequencies are light of 10 MHz and light of 40 MHz. Two types of irradiation light having different frequencies are emitted, for example, in a time-division manner.

The light receiving part 1c receives reflected light that is the irradiation light emitted from the light emitting part 1b and is reflected by the measurement object 100 returning to the light receiving part 1c. The light receiving part 1c has, for example, a light receiving sensor (image sensor) in which light receiving elements are arranged in a two-dimensional array.

The reception of the reflected light by the light receiving part 1c is performed in synchronization with the light emission cycle of the irradiation light by the light emitting part 1b.

The light receiving part 1c accumulates the reflected light over tens of thousands of times (tens of thousands of cycles) of the intensity change of the irradiation light, and outputs data proportional to the amount of received light accumulated. This is because the amount of reflected light received for one cycle of irradiation light is very small, so that significant data may not be obtained. That is, by accumulating the reflected light for tens of thousands of cycles, a sufficient amount of received light can be obtained, and significant information can be acquired.

Note that the light receiving part 1c may be provided with a condenser lens in order to efficiently receive the reflected light.

The amplitude detection part 1d calculates the amplitude of the reflected light for each pixel from the amount of light received by the light receiving part 1c. The calculated amplitude information is used in the processing of the operation processing part 1f, which will be described later.

The phase difference detection part 1e calculates for each pixel a phase difference indicating how much the reflected light received in synchronization with the emission of the irradiation light is deviated from the irradiation light. Since the phase difference is proportional to the distance to the measurement object 100 (hereinafter, also simply referred to as "distance"), the distance to the measurement object 100 can be calculated using the phase difference. This will be described later specifically.

The operation processing part 1f uses the amplitude information for each pixel detected by the amplitude detection part 1d, the phase difference information for each pixel detected by the phase difference detection part 1e, the correction data, and the like, to calculate the distance to the measurement object 100 for each pixel. Details of the operation for calculating the distance will be described later.

The storage part 1g stores correction data, correction formulas, and the like used when the operation processing part 1f calculates the distance.

The output part 1h performs processing of outputting the information of distance to the measurement object 100 calculated for each pixel by the operation processing part 1f as a distance image.

<2. Irradiation Light and Reflected Light>

Figure 2:
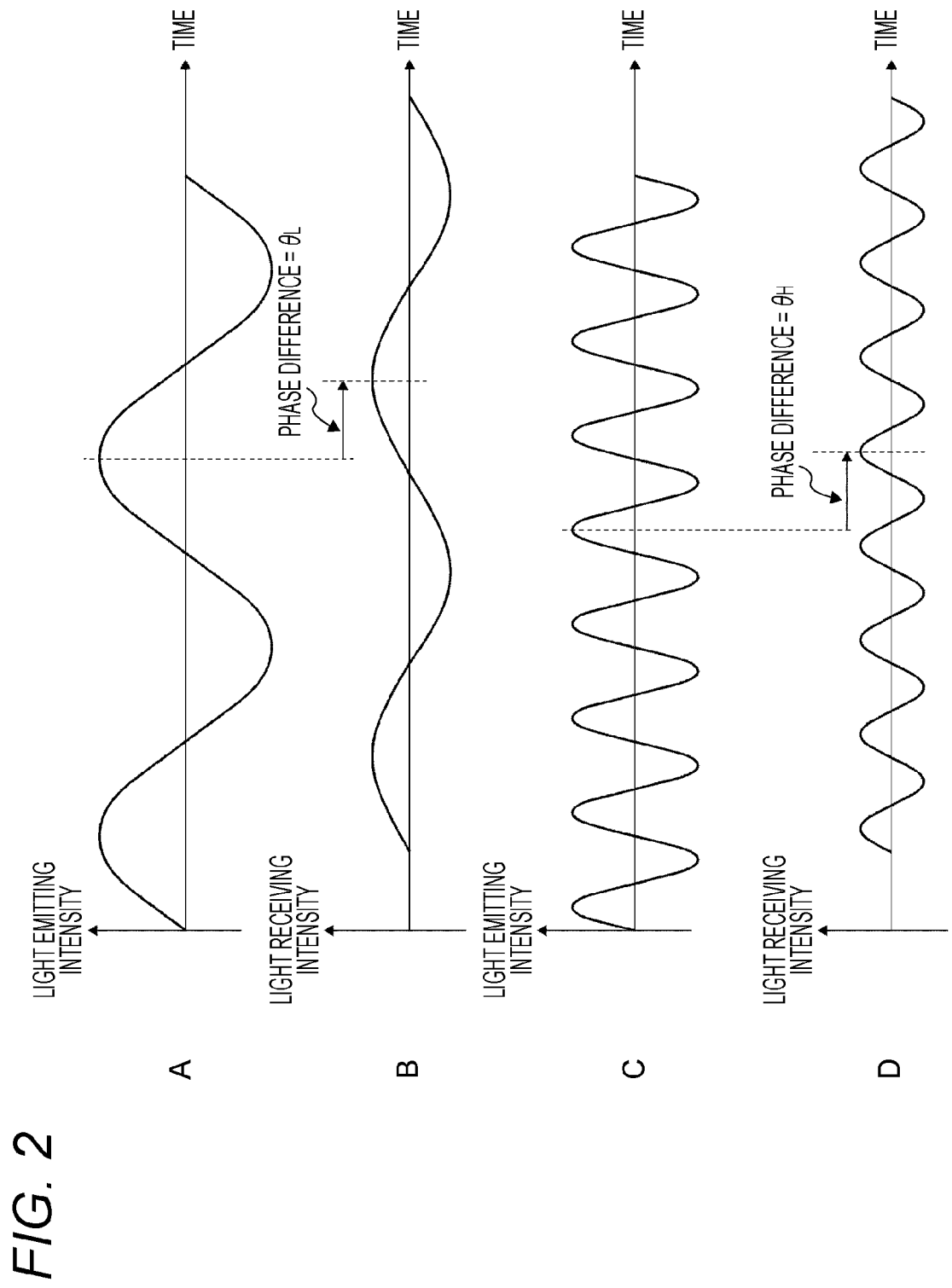
FIG. 2 is a diagram for explaining a phase difference between irradiation light and reflected light of the embodiment.

The relationship between the irradiation light and the reflected light will be described with reference to FIG. 2.

FIG. 2A is a diagram showing the time change of the intensity of the irradiation light of 10 MHz emitted from the light emitting part 1b. FIG. 2B is a diagram showing the time change of the light intensity when the reflected light of 10 MHz is received by the light receiving part 1c.

Assuming that the phase difference between the irradiation light of 10 MHz (FIG. 2A) and the reflected light of 10 MHz (FIG. 2B) is a phase difference $\theta_L$, the phase difference $\theta_L$ corresponds to the time in which the light reciprocates between the distance measuring apparatus 1 and the measurement object 100. Note that, in a case where the amplitude of the reflected light shown in FIG. 2B is extremely small, it is difficult to detect the phase difference $\theta_L$ of the reflected light, and a large number of errors are likely to be included.

FIG. 2C is a diagram showing the time change of the intensity of the irradiation light of 40 MHz emitted from the light emitting part 1b. FIG. 2D is a diagram showing the time change of the light intensity when the reflected light of 40 MHz is received by the light receiving part 1c.

Assuming that the phase difference between the irradiation light of 40 MHz (FIG. 2C) and the reflected light of 40 MHz (FIG. 2D) is a phase difference $\theta_H$, the phase difference $\theta_H$ corresponds to the time in which the light reciprocates between the distance measuring apparatus 1 and the measurement object 100. Note that, in a case where the amplitude of the reflected light shown in FIG. 2D is extremely small, it is difficult to detect the phase difference $\theta_H$ of the reflected light, and a large number of errors are likely to be included.

The resolution of the phase difference that can be detected by the phase difference detection part 1e is finite. The distance to the measurement object 100 can be calculated by dividing the phase difference $\theta_L$ and the phase difference $\theta_H$ by 2πf (f: frequency of the irradiation light), multiplying the division result by the light speed c, and further dividing the multiplication result by 2. Accordingly, the resolution of the distance becomes higher as the value of f increases. That is, the distance resolution is higher when irradiation light of 40 MHz is used than when irradiation light of 10 MHz is used. Specifically, if the frequency f is quadrupled, the distance resolution is also proportionally quadrupled.

Figure 3:
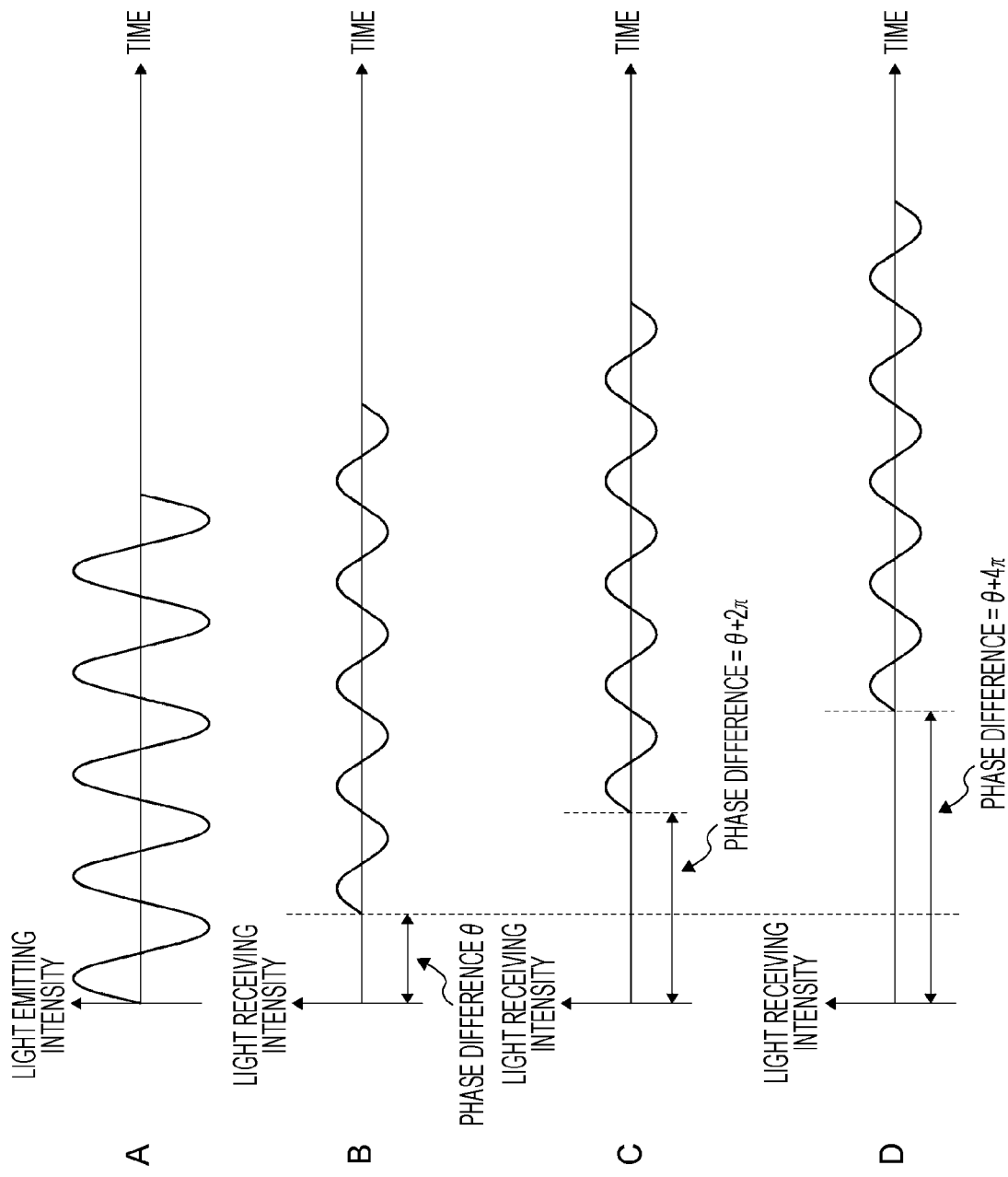
FIG. 3 is a diagram for explaining indefiniteness of distance of the embodiment.

Next, the indefiniteness of the distance will be described with reference to FIG. 3.

FIG. 3A is a diagram showing the time change of the intensity of the irradiation light of a predetermined frequency emitted from the light emitting part 1b. FIG. 3B is a diagram showing the time change of the light intensity when the reflected light that is the irradiation light reflected by the measurement object is received by the light receiving part 1c.

The phase difference θ between FIGS. 3A and 3B is proportional to the distance between the distance measuring apparatus 1 and the measurement object 100. As the distance between the distance measuring apparatus 1 and the measurement object 100 increases, the phase difference eventually reaches (θ+2π) (FIG. 3C). As similar to this, there is a distance between the distance measuring apparatus 1 and the measurement object 100 whose phase difference is (θ+4π) (FIG. 3D).

Since the phase difference detection part 1e of the distance measuring apparatus 1 detects the phase difference between the irradiation light and the reflected light in the range of 0 to 2π, the phase difference θ, the phase difference (θ+2π), and the phase difference (θ+4π) cannot be distinguished. That is, there is a risk that the distance measurement distance will be indefinite. Accordingly, the distance measuring range in the distance measuring apparatus 1 is a distance at which the phase difference is less than 2π.

As described above, since the distance can be calculated by c×phase difference θ/4πf, the smaller the frequency f, the longer the distance measurement range. That is, in a case of comparing the case where the frequency f is 10 MHz and the case where the frequency f is 40 MHz, the distance measurement range of 10 MHz is four times longer than that of the case of 40 MHz.

Figure 4:
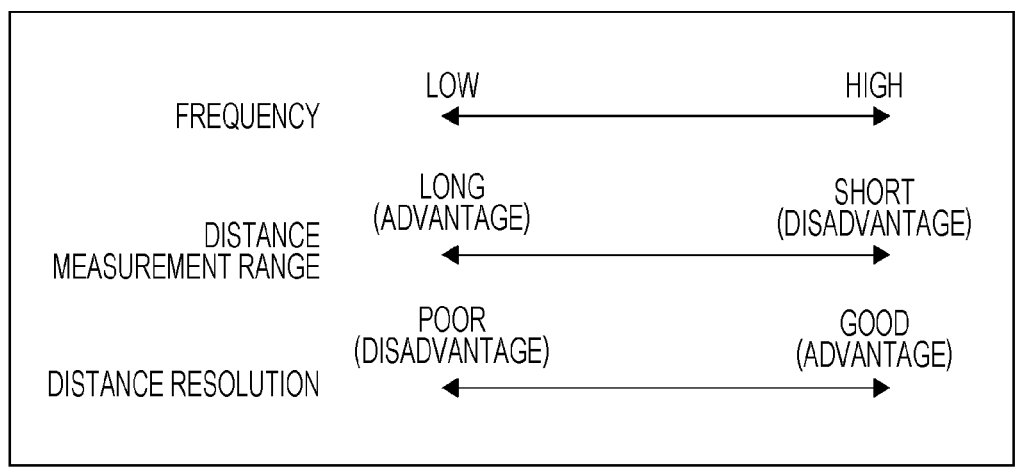
FIG. 4 is a diagram for explaining a relationship between distance resolution and distance measurement range.

FIG. 4 summarizes the distance resolution and distance measurement range.

As shown in FIG. 4, the lower the frequency f, the longer the distance measurement range but the lower the distance resolution. Furthermore, the higher the frequency f, the higher the distance resolution but the shorter the distance measurement range.

That is, if the frequency f is lowered, the distance resolution is lowered as a drawback, and if the frequency f is raised, the distance range is shortened as a drawback.

3. Embodiment

In the present technology, in order to overcome the drawbacks described above, distance measurement is performed using two frequencies. A distance measuring method used in the present technology will be described.

<3-1. Pre-Measurement of Correction Value>

In the above description, it is premised that the time change of the light intensity of the irradiation light forms an ideal sine wave by performing the intensity modulation at a predetermined frequency f. However, in reality, the time change of the light intensity of the irradiation light does not form an ideal sine wave, and includes not a little error. Therefore, in the present embodiment, the error of the distance measurement result caused by the intensity change not being an accurate sine wave is corrected. In the following description, the distance measurement result before the error correction is described as "distance before correction", and the distance measurement result calculated as a result of error correction is described as "distance after correction". Furthermore, the actual distance between the distance measuring apparatus 1 and the measurement object 100 is described as "true distance".

The correction amount for converting the distance before correction into the distance after correction is measured, for example, in the manufacturing process before shipment of the distance measuring apparatus 1. Specifically, the correspondence between the distance before correction and the true distance is calculated while gradually changing the distance between the distance measuring apparatus 1 and the measurement object 100.

The correction amount calculated from the measurement result is stored in the storage part 1g of the distance measuring apparatus 1. Note that correction amount information may be configured so that it can be acquired from another information processing apparatus via a communication network.

In a case of measuring the distance using the distance measuring apparatus 1, the distance after correction is calculated using the distance before correction and the correction value acquired from the storage part 1g.

The correction value stored in the storage part 1g may be a function showing the relationship between the distance before correction and the correction amount, or may be a correspondence table showing the relationship between the distance before correction and the correction amount. In a case of storing a correspondence table showing the relationship between some typical distances before correction and the correction amount in the storage part 1g, the correction amount for the distance before correction that is not stored may be configured to be obtained by linear interpolation or the like.

Since it takes time to calculate the correction amount in the manufacturing process before shipment, there is a risk that the manufacturing cost will increase. In particular, in a case where two frequencies are used as in the present technology, if the correction amount for each is calculated, the manufacturing cost increases.

Therefore, in the present embodiment, the correction amount is calculated only for one of the two frequencies used (for example, 10 MHz and 40 MHz).

Accordingly, in a case where the distance measurement is performed using a frequency for which the correction amount has not been calculated in the manufacturing process, the correction amount is unknown, so that the distance before correction including an error cannot be corrected.

The method for solving this point will be described below.

<3-2. Correction of Distance Measurement Data>

First, some definitions will be given in the explanation.

Subscripts i and j used for some variables described later are defined as in Equation 1.

[Math. 1]

$$i, j \in \{(t, u, v) \; t \text{ denotes time}, (u, v) \text{ denotes pixel position of the camera screen}\} \quad \text{Equation 1}$$

That is, each of the subscripts i and j indicates their positions in spatiotemporal space. Furthermore, the subscript i is used to indicate the pixel of interest. In the description below, the subscripts will be described as pixel position i and pixel position j.

The case where 10 MHz and 40 MHz are adopted as the two frequencies used for the drive signal will be described. Note that $f_L=10$ MHz and $f_H=40$ MHz. Note that the adoption of 10 MHz and 40 MHz is just an example, other frequencies may be used, and one does not have to be an integral multiple of the other. However, $f_L$ and $f_H$ have at least different frequencies.

In order to correct the error caused by the time change of the emission intensity not being an ideal sine wave, a correction amount for each distance is required as described above. Here, an example is given in which the correction amount for the frequency $f_H$ (=40 MHz) is calculated in advance, but the correction amount for the frequency $f_L$ (=10 MHz) is not calculated in advance. Of course, the correction amount for the frequency $f_L$ may be calculated in advance.

Therefore, since the correction amount is known for the data measured using the frequency $f_L$, the data can be corrected, and correct distance measurement can be performed if the random noise component as described later is not taken into consideration.

It is assumed that the correspondence between the "distance before correction" and the "true distance" in a case where distance measurement is performed using the frequency $f_H$ is $E_H(d)$. d indicates the distance before correction.

On the other hand, in a case where distance measurement is performed using the frequency $f_L$, it is considered that an error is included even if the random noise component is ignored. Assuming that the maximum value of the error is $e_L$, the maximum error value $e_L$ satisfies Equation 2.

[Math. 2]

$$0 \le e_L < \frac{c}{4f_H} \quad \text{Equation 2}$$

Distance measurement data using frequency $f_L$ may include an error of the maximum error value $e_L$ in terms of distance. In other words, in a case of using in an environment where the maximum error value $e_L$ satisfies Equation 2, the method as described later can be used.

Assuming that the phase difference at the pixel position j in a case where the distance is measured using the frequency $f_L$ is $\theta_{L(j)}$, the distance before correction $D_{L(j)}$ can be expressed using Equation 3.

[Math. 3]

$$D_{L(j)} = \frac{\theta_{L(j)}}{2\pi} \frac{c}{2f_L} \quad \text{Equation 3}$$

Since the distance before correction $D_{L(j)}$ is the maximum error value $e_L$ as described above, it can be expressed using Equation 4.

[Math. 4]

$$D_{L(j)} - e_L \le D_{(j)} \le D_{L(j)} + e_L \quad \text{Equation 4}$$

Here, $D_{(j)}$ is the true distance to the measurement object 100 measured at the pixel position j.

On the other hand, assuming that the phase difference at the pixel position j in a case where the distance is measured using the frequency $f_H$ is $\theta_{H(j)}$, the distance before correction $D'_{H(j,n)}$ can be expressed using Equation 5.

[Math. 5]

$$D'_{H(j,n)} = \frac{\theta_{H(j)} + 2n\pi}{2\pi} \frac{c}{2f_H} \quad \text{Equation 5}$$

Here, n represents an integer of 0 or more, which is an unknown value at this time.

$D'_{H(j,n)}$ calculated using Equation 5 includes an error due to the fact that the time change of the light intensity of the irradiation light is not an ideal sine wave, so that the correction using the correction value is necessary. The correction value $E_H(d)$ is known and is stored in, for example, the storage part 1g.

Therefore, the distance after correction $D_H(j,n)$ can be expressed using Equation 6.

[Math. 6]

$$D_{H(j,n)} = D'_{H(j,n)} - E_H(D'_{H(j,n)}) \quad \text{Equation 6}$$

$E_H(D'_{H(j,n)})$ is a correction value when the distance measurement result before correction is $D'_{H(j,n)}$ as described above.

The relationship of Equation 7 holds between the distance after correction $D_{H(j,n)}$ calculated by Equation 6 and the true distance $D_{(j)}$ in a case where the random noise component as described later is not taken into consideration.

[Math. 7]

$$D_{(j)} = D_{H(j,n)} \quad \text{Equation 7}$$

The unknown number n can be calculated by using Equation 3, Equation 4, Equation 5, Equation 6, and Equation 7. Assuming that the calculated unknown number n is $n_0$, the distance after correction $D_{H(j,n)}$ is the corrected distance $D_{H(j,n_0)}$. $D_{H(j)}$ is defined by Equation 8 using this distance after correction.

[Math. 8]

$$D_{H(j)} \stackrel{def}{=} D_{H(j,n_0)} \quad \text{Equation 8}$$

Therefore, Equation 9 holds.

[Math. 9]

$$D_{(j)} = D_{H(j)} \quad \text{Equation 9}$$

As can be understood from the above, n that has been an unknown number is determined by using Equations 3 and 4. Since Equations 3 and 4 are equations for frequency $f_L$, the unknown number n can be determined by using distance measurement data using not only frequency $f_H$ but also frequency $f_L$. That is, the indefiniteness of the unknown number n can be eliminated.

In the explanation so far, each equation has been defined assuming that there is no random noise component, but the actual ranging data includes a random noise component. Hereinafter, a method of correcting the distance measurement data in consideration of the random noise component will be described.

Assuming that the random noise component at pixel position j in a case where distance measurement is performed using the frequency $f_L$ is $R_{L(j)}$. Furthermore, the correction amount in a case where distance measurement is performed using the frequency $f_L$ is $E_L(d)$. d indicates the distance before correction. Accordingly, the correction amount at the pixel position j is $E_L(D_{L(j)})$. Note that $E_L(d)$ is an unknown function because the correction value is not measured in advance. At this time, the true distance $D_{(j)}$ can be expressed using Equation 10.

[Math. 10]

$$D_{(j)} = D_{L(j)} - E_L(D_{L(j)}) + R_{L(j)} \quad \text{Equation 10}$$

On the other hand, in a case where distance measurement is performed using the frequency $f_H$ and the random noise component at the pixel position j is $R_{H(j)}$, the true distance $D_{(j)}$ can be expressed using Equation 11.

[Math. 11]

$$D_{(j)} = D_{H(j)} + R_{H(j)} \quad \text{Equation 11}$$

Note that as described above, $D_{H(j)}$ represents the distance after correction.

Assuming that the pixel position of interest is the pixel position of interest i. Equation 12 is obtained by expanding the unknown function $E_L(d)$ around $D_{L(i)}$ by Taylor series and approximating it with terms up to the second order.

[Math. 12]

$$E_L(d) = E_0 E_1 \times (d - D_{L(i)}) + E_2 \times (d - D_{L(i)})^2 \quad \text{Equation 12}$$

$E_0$, $E_1$, and $E_2$ in Equation 12 are unknown.

Equation 13 is obtained from Equation 10 and Equation 12.

[Math. 13]

$$D_{(j)} = D_{L(j)} - (E_0 + E_1 \times (D_{L(j)} - D_{L(i)}) + E_2 \times (D_{L(j)} - D_{L(i)})^2) + R_{L(j)} \quad \text{Equation 13}$$

Here, the standard deviation of the random noise component $R_L(j)$ is substantially equal to the light receiving intensity at the pixel position j in a case where distance measurement is performed using the frequency $f_L$, that is, the amplitude $A_{L(j)}$ of the sine wave. Therefore, Equation 14 holds.

[Math. 14]

$$R_{L(j)} \sim N(0, A_{L(j)}^2) \quad \text{Equation 14}$$

Note that N represents a Gaussian symbol.

The standard deviation of the random noise component $R_{H(j)}$ is substantially equal to the light receiving intensity at the pixel position in a case where distance measurement is performed using the frequency $f_H$, that is, the amplitude $A_{H(j)}$ of the sine wave. Therefore, Equation 15 holds.

[Math. 15]

$$R_{H(j)} \sim N(0, A_{H(j)}^2) \quad \text{Equation 15}$$

By finding the unknown numbers $E_0$, $E_1$, $E_2$ and $D_{(j)}$ such that the squared value of the error is the minimum value, the maximum likelihood value $D_{(i)}$ of the distance to the measurement object 100 measured by a pixel position of interest i can be calculated. The equation to be solved is shown in Equation 16.

[Math. 16]

$$\operatorname*{argmin}_{E_0, E_1, E_2, D_{(j)}} \sum_j \left(\frac{R_{L(j)}}{A_{L(j)}}\right)^2 + \left(\frac{R_{H(j)}}{A_{H(j)}}\right)^2 = \operatorname*{argmin}_{E_0, E_1, E_2, D_{(j)}}$$

$$\sum_j \left(\frac{\{D_{L(j)} - (E_0 + E_1 \times (D_{L(j)} - D_{L(i)}) + E_2 \times (D_{L(j)} - D_{L(i)})^2)\} - D_{(j)}}{A_{L(j)}}\right)^2 +$$

$$\left(\frac{D_{H(j)} - D_{(j)}}{A_{H(j)}}\right)^2$$

Equation 16

In Equation 16, the pixel position j for calculating the distance measured at the pixel position of interest i is the pixel position of interest i, and is a pixel position different from the pixel position of interest i in spatiotemporal space. Here, the function $E_L(d)$ indicating the correction amount performs a quadratic approximation by Taylor series expansion as shown in Equation 12. Accordingly, it is preferable to use only the pixel positions within the range in which this quadratic approximation holds. That is, the pixel position j may not be any pixel position. That is, the pixel positions j to be added in Equation 16 are limited to those satisfy Equation 17.

[Math. 17]

$$|D_{L(j)} - D_{L(i)}| \leq Th \quad \text{Equation 17}$$

The threshold Th is a small value.

Furthermore, if addition is performed for all the pixel positions in spatiotemporal space, the amount of calculation becomes enormous, and the convenience of the distance measuring apparatus 1 may be impaired. Therefore, it is desirable to add only the pixel positions in the vicinity of the pixel position of interest i as the pixel position j. That is, it is desirable that the pixel positions j to be added in Equation 16 are "the pixel positions of interest i and the pixel positions in the vicinity of the pixel position of interest i" and satisfy Equation 17.

<3-3. Processing Flow>

An example of a specific processing flow for performing distance measurement and correction of distance measurement data by the above-mentioned method will be described with reference to the attached drawings.

Figure 5:
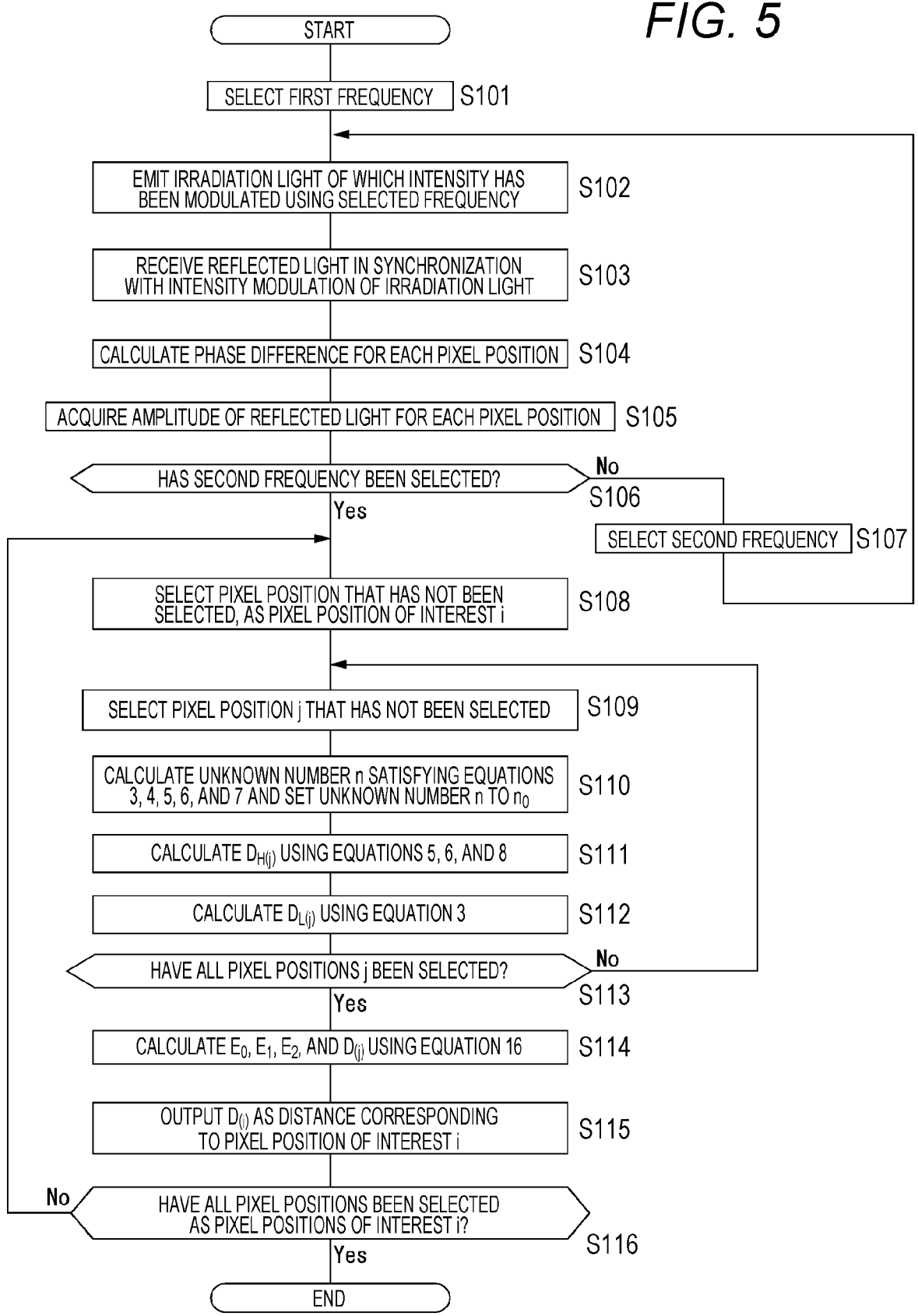
FIG. 5 is a flowchart for performing distance measurement processing according to the embodiment.

As shown in FIG. 5, the operation processing part if of the distance measuring apparatus 1 selects a first frequency in step S101. In this example, the first frequency and a second frequency are used, the first frequency is, for example, 40 MHz, which is higher than the second frequency.

Subsequently, in step S102, the operation processing part 1f gives an instruction to emit the irradiation light of which intensity has been modulated using the selected frequency. According to this instruction, the light emitting part 1b of the distance measuring apparatus 1 emits light.

In step S103, the operation processing part if gives an instruction to receive the reflected light in synchronization with the intensity modulation of the irradiation light. Therefore, the light receiving operation of the light receiving part 1c of the distance measuring apparatus 1 is performed.

In step S104, the operation processing part if performs processing of calculating the phase difference for each pixel position. In this processing, the phase shift between the intensity change of the received reflected light and the intensity change of the light emission is calculated.

In step S105, the operation processing part if acquires the amplitude of the reflected light for each pixel position.

By performing each processing from step S101 to step S105, subsequently, in step S106, the operation processing part 1f performs processing of determining whether or not the second frequency different from the first frequency has been selected. In a case where only the first frequency has been selected and the second frequency has not been selected, the operation processing part 1f performs processing of selecting the second frequency in step S107. The second frequency is, for example, 10 MHz, which is lower than the first frequency.

After selecting the second frequency, the operation processing part 1f performs various types of processing and instructions by performing processing from step S102 to step S105.

After performing processing from step S102 to step S106 using the first frequency and the second frequency, the operation processing part 1f checks that the second frequency has been selected in step S106, and performs the processing of step S108.

In the processing of step S108, the unselected pixel position of each pixel of the light receiving sensor arranged in the two-dimensional array is selected as the pixel position of interest i. Subsequent each processing from step S109 to step S115 is processing to be performed for the pixel position of interest i selected here.

The operation processing part 1f selects an unselected pixel position j in step S109.

In step S110, the operation processing part if calculates an unknown number n that satisfies Equations 3, 4, 5, 6, and 7 for the pixel position of interest i and pixel position j, and sets the calculated n as no.

Next, the operation processing part 1f calculates $D_{H(j)}$ using Equations 5, 6 and 8 in step S111, and calculates $D_{L(j)}$ using Equation 3 in step S112.

Subsequently, the operation processing part if determines in step S113 whether or not all the pixel positions j have been selected. In a case where all the pixel positions j have not been selected for one pixel position of interest i, the operation processing part if selects the pixel position that has not been selected as the pixel position j in step S109 as the pixel position J.

The operation processing part 1f performs each processing from step S110 to step S112 for the newly selected pixel position j. That is, each processing from step S110 to step S112 is performed for all the pixel positions j.

In a case where the operation processing part if determines that all the pixel positions j have been selected in step S113, in step S114, the operation processing part 1f calculates $E_0$, $E_1$, $E_2$ and $D_{(i)}$ using Equation 16, and in step S115, performs processing of outputting $D_{(i)}$ from the output part 1h as the distance corresponding to the pixel position of interest i.

Subsequently, in step S116, the operation processing part 1f determines whether or not there is a pixel position that has not been selected as the pixel position of interest i, that is, whether or not all the pixel positions have been selected as the pixel position of interest i.

In a case where there is a pixel position that has not been selected as the pixel position of interest i, the operation processing part 1f performs step S108 again, selects a new pixel position as the pixel position of interest i, and performs each processing of step S109 to step S115 for the new pixel position of interest i.

The operation processing part 1f can calculate and output the distance $D_{(i)}$ for all the pixel positions by perform each processing from step S108 to step S116.

<4. Conclusion>

As described above, an arithmetic processing apparatus (distance measuring apparatus 1 that performs various types of processing for distance measurement) includes an operation processing part 1f that performs processing of: calculating a first distance $(D'_{H(j,n)})$ to a measurement object 100 by emitting and receiving first irradiation light (light of 40 MHz) of which intensity is modulated by a first modulation signal of a first frequency (for example, 40 MHz); calculating a second distance $(D_{L(j)})$ to the measurement object 100 by emitting and receiving second irradiation light (light of 10 MHz) of which intensity is modulated by a second modulation signal of a second frequency (for example, 10 MHz) different from the first frequency; calculating a corrected first distance $(DH_{(j,n)})$ using first correction data (correction value $E_H(D'_{H(j,n)})$) that has been acquired; and determining the corrected first distance within an error range of the second distance as a third distance using the second distance (that is, specifying an unknown number n and set n as no.

Of the distances measured by two types of light modulated by two modulation signals having different frequencies, one is regarded as information having excellent distance resolution and the other is regarded as information having excellent distance measuring range.

Accordingly, by using a plurality of beams of light, it is possible to perform appropriate distance measurement in consideration of both the distance measurement range and the distance resolution.

Furthermore, as long as there is correction data (first correction data) for the distance measurement result acquired by the measurement using one of the plurality of beams of light (that is, the first distance), it is possible to acquire a highly accurate measurement result as the third distance.

Moreover, in a case where the correction data is prepared in advance before the measurement, only the data for correcting the distance measurement result using one of the plurality of beams of light needs to be prepared, so that the inspection time for acquiring the correction data and the shipment inspection items can be reduced, which can contribute to cost reduction.

Furthermore, even in a case where the correction data for the measurement result is inconsistent due to the aged deterioration of the distance measuring apparatus, only the correction data for correcting the measurement result using one of the plurality of beams of light needs to be updated, so that maintenance time can be shortened.

Note that, in the measurement result using the light with the higher distance resolution (light of which intensity is modulated by the modulated signal of the higher frequency), there may be multiple candidates for the corrected first distance to be presented. Even in such a case, it is possible to narrow down to one distance measurement result from a plurality of candidates of corrected first distance by using the measurement result using the light of which distance measurement range is advantageous (the light of which intensity is modulated by the modulation signal of the lower frequency). The distance measurement result narrowed down to one is regarded as the third distance. That is, it is possible to correctly derive the distance to the measurement object.

Furthermore, the first correction data (correction value) may be data for correcting an error of a measurement distance caused by an error in the intensity change of the first irradiation light with respect to the sine wave of the first frequency (for example, 40 MHz).

The first distance is considered to include an error due to the fact that the intensity change of the first irradiation light does not form an accurate sine wave.

By using the first correction data as the data for correcting the error, it is possible to correct the measurement result with high accuracy. For example, the first correction data is unique to each individual, according to the error between the first irradiation light and the accurate sine wave differs depending on the individual difference of the distance measuring apparatus. Furthermore, the first correction data is calculated in advance by the inspection performed at the time of manufacturing the distance measuring apparatus, and is referred to every time the distance measuring apparatus performs the distance measuring operation, so that it is not necessary to calculate the first correction data every time the distance measurement is performed, it is possible to quickly derive the corrected distance measurement result.

Moreover, the first frequency (for example, 40 MHz) may be higher than the second frequency (for example, 10 MHz).

Of the light of which intensity is modulated by the first modulation signal (first irradiation light) and the light of which intensity is modulated by the second modulation signal (second irradiation light), the distance measurement result using the first irradiation light in which the error for an accurate sine wave can be corrected is more suitable for measuring an accurate distance. Furthermore, since the second irradiation light has a lower frequency than the first irradiation light, the distance measuring range is excellent.

That is, since it is possible to calculate an accurate distance by the first irradiation light while grasping a rough distance by the second irradiation light, it is possible to acquire the distance measurement result (third distance) that is excellent in both the distance measurement range and accuracy.

Moreover, the third distance may be considered to include an error due to noise, and the arithmetic processing apparatus may further include processing of: acquiring second correction data ($E_L(d)$) for correcting an error of the second distance caused by an error in an intensity change of the second irradiation light with respect to a sine wave of the second frequency; defining a corrected second distance ($D_{L(j)}$-$E_L(D_{L(j)})$) obtained by correcting the second distance ($D_{L(j)}$) using the second correction data; defining a difference between the corrected first distance ($D_{H(j)}$) and the third distance ($D_{H(j)}$+$R_{H(j)}$) as a first difference, defining a difference between the corrected second distance and the third distance ($D_{L(j)}$−$E_L(D_{L(j)})$+$R_{L(j)}$) as a second difference, and calculating an error due to the noise so that the first difference and the second difference become smaller (that is, the second correction data $E_L(d)$ for correcting an error due to noise). The third distance includes not only an error that can be corrected by the first correction data, that is, an error due to the fact that the intensity change of the first irradiation light does not form an accurate sine wave, but also an error due to the noise component such as natural light entering the light receiving part during distance measurement (error due to noise). In order to acquire an appropriate distance measurement result in consideration of the error due to noise, the second correction data for correcting the error of the second distance due to the fact that the intensity change of the second irradiation light includes an error with respect to the sine wave is calculated, and moreover, an error due to noise is appropriately calculated from the difference of the third distance with each of the corrected first distance and the corrected second distance.

As a result, it is possible to accurately correct the third distance in consideration of all of the error caused by the intensity change of the first irradiation light including an error with respect to the sine wave, the error caused by the intensity change of the second irradiation light including an error with respect to the sine wave, and the error included in the third distance due to the noise.

In addition, the second correction data ($E_L(d)$) may be defined by a correction function (Equation 12) approximated by a quadratic Taylor series expansion.

By expressing the second correction data with a correction function approximated by the second-order Taylor series expansion, it is not necessary to perform measurement in advance.

That is, since the correction data is calculated in advance for only one of the first irradiation light and the second irradiation light, it is possible to shorten the manufacturing process and the inspection process.

Then, the error of the third distance may be calculated so that the second difference becomes smaller for a neighboring pixel in spatiotemporal space with respect to a pixel of interest (pixel position of interest i).

In order to correct the error of the third distance for the pixel targeted for distance measurement (that is, the pixel of interest), each coefficient of the approximate expansion is calculated so that not only the first difference and the second difference of the pixel of interest, but also a first difference and a second difference of neighboring pixel in the spatiotemporal space of the pixel of interest become smaller.

As a result, the accuracy of the coefficient of the approximate expression can be improved, and the third distance as a distance measurement result in the pixel of interest can be corrected more accurately.

Furthermore, the neighboring pixel may be a pixel that has been extracted under a condition (Equation 17) that the difference between the second distance before correction for the pixel of interest and the second distance before correction for the neighboring pixel is equal to or less than a predetermined threshold.

As a result, even for a neighboring pixel of the pixel of interest, a neighboring pixel of which the third distance before correction is deviated by a predetermined threshold or more is not used for calculation (that is, calculation of a correction value for correcting the third distance)of the error of the third distance.

Accordingly, the error of the third distance is calculated with higher accuracy, and the third distance can be corrected with higher accuracy.

Note that the distance measuring apparatus 1 includes: a light emitting part 1b capable of light emission of first irradiation light (light of 40 MHz) of which intensity is modulated by a first modulation signal of a first frequency (for example, 40 MHz), and light emission of second irradiation light (light of 10 MHz) of which intensity is modulated by a second modulation signal of a second frequency (for example, 10 MHz) different from the first frequency; a light receiving part 1c that receives reflected light that is light emitted from the light emitting part 1b and reflected by a measurement object 100; and an operation processing part 1f that performs processing of calculating a first distance ($D'_{H(j,n)}$) to a measurement object 100 by emitting and receiving first irradiation light, calculating a second distance ($D_{L(j)}$) to the measurement object 100 by emitting and receiving second irradiation light, calculating a corrected first distance ($D_{H(j,n)}$)using first correction data (correction value: $E_H(D'_{H(j,n)})$) that has been acquired, and determining the corrected first distance within an error range of the second distance as a third distance using the second distance (that is, specifying an unknown number n and set n as $n_0$).

Pieces of irradiation light whose intensity is modulated at different frequencies can be emitted and each reflected light reflected by the measurement object can be received, and therefore, two pieces of distance measurement data with different distance resolution and distance measurement range can be acquired. It is possible to calculate the third distance as the measurement distance from these two distance measurement data.

That is, it is possible to perform distance measurement having an excellent distance measurement range and excellent distance resolution.

Furthermore, the distance measuring apparatus 1 may include a storage part 1g in which the first correction data is stored.

By storing the first correction data in the storage part, it is not necessary to communicate with the outside in the correction processing of the first distance. That is, the processing load when correcting the first distance is reduced, the corrected first distance can be calculated quickly, and the third distance can also be calculated quickly.

Note that the effects described in the present specification are merely examples and are not intended to be limiting, and other effects may be provided.

Note that the present technology can adopt the following configuration.

(1)

An arithmetic processing apparatus including an operation processing part that performs processing of:
calculating a first distance to a measurement object by emitting and receiving first irradiation light of which intensity is modulated by a first modulation signal of a first frequency;
calculating a second distance to the measurement object by emitting and receiving second irradiation light of which intensity is modulated by a second modulation signal of a second frequency different from the first frequency;
calculating a corrected first distance using first correction data that has been acquired; and
determining the corrected first distance within an error range of the second distance as a third distance using the second distance.

(2)

The arithmetic processing apparatus according to (1),
in which the first correction data is data for correcting an error of a measurement distance caused by an error in an intensity change of the first irradiation light with respect to a sine wave of the first frequency.

(3)

The arithmetic processing apparatus according to any one of (1) or (2),
in which the first frequency is set to be higher than the second frequency.

(4)

The arithmetic processing apparatus according to any one of (1) to (3),
in which the third distance is considered to include an error due to noise, and
the arithmetic processing apparatus further includes processing of:
acquiring second correction data for correcting an error of the second distance caused by an error in an intensity change of the second irradiation light with respect to a sine wave of the second frequency;
defining a corrected second distance obtained by correcting the second distance using the second correction data;
defining a difference between the corrected first distance and the third distance as a first difference;
defining a difference between the corrected second distance and the third distance as a second difference; and
calculating an error due to the noise so that the first difference and the second difference become smaller.

(5)

The arithmetic processing apparatus according to (4),
in which the second correction data is defined by a correction function approximated by a second-order Taylor series expansion.

(6)

The arithmetic processing apparatus according to (5),
in which the error of the third distance is calculated so that the second difference becomes smaller for a neighboring pixel in spatiotemporal space with respect to a pixel of interest.

(7)

The arithmetic processing apparatus according to (6),
in which the neighboring pixel is a pixel that has been extracted under a condition that the difference between the second distance before correction for the pixel of interest and the second distance before correction for the neighboring pixel is equal to or less than a predetermined threshold.

(8)

A distance measuring apparatus including:
a light emitting part capable of light emission of first irradiation light of which intensity is modulated by a first modulation signal of a first frequency, and light emission of second irradiation light of which intensity is modulated by a second modulation signal of a second frequency different from the first frequency;
a light receiving part that receives reflected light that is light emitted from the light emitting part and reflected by a measurement object; and
an operation processing part that performs processing of calculating a first distance to a measurement object by emitting and receiving first irradiation light, calculating a second distance to the measurement object by emitting and receiving the second irradiation light, calculating a corrected first distance using first correction data that has been acquired, and determining the corrected first distance within an error range of the second distance as a third distance using the second distance.

(9)

The distance measuring apparatus according to (8), further including
a storage part in which the first correction data is stored.

(10)

An arithmetic processing method performed by an arithmetic processing apparatus, the method including:
calculating a first distance between a distance measuring apparatus and a measurement object by emitting and receiving light of which intensity is modulated by a first modulation signal of a first frequency;
calculating a second distance between the distance measuring apparatus and the measurement object by emitting and receiving light of which intensity is modulated by a second modulation signal of a second frequency different from the first frequency;
calculating a corrected first distance using first correction data that has been acquired; and
determining the corrected first distance within an error range of the second distance as a third distance using the second distance.

REFERENCE SIGNS LIST

1 Distance measuring apparatus
1b Light emitting part
1c Light receiving part
1f Operation processing part
1g Storage part
100 Measurement object

The invention claimed is:
1. An arithmetic processing apparatus comprising:
a memory storing instructions, and
a processor configured to execute the instructions to perform operations comprising:

calculating a first distance to a measurement object by emitting and receiving first irradiation light of which intensity is modulated by a first modulation signal of a first frequency;

calculating a second distance to the measurement object by emitting and receiving second irradiation light of which intensity is modulated by a second modulation signal of a second frequency different from the first frequency;

calculating a corrected first distance using first correction data that has been acquired;

determining whether the corrected first distance is within an error range of the second distance as a third distance using the second distance;

determining that the third distance is considered to include an error due to noise;

acquiring second correction data for correcting an error of the second distance caused by an error in an intensity change of the second irradiation light with respect to a sine wave of the second frequency;

defining a corrected second distance obtained by correcting the second distance using the second correction data;

defining a difference between the corrected first distance and the third distance as a first difference;

defining a difference between the corrected second distance and the third distance as a second difference; and calculating an error due to the noise so that the first difference and the second difference become smaller.

2. The arithmetic processing apparatus according to claim 1, wherein the first correction data is data for correcting an error of a measurement distance caused by an error in an intensity change of the first irradiation light with respect to a sine wave of the first frequency.

3. The arithmetic processing apparatus according to claim 1, wherein the first frequency is set to be higher than the second frequency.

4. The arithmetic processing apparatus according to claim 1, wherein the second correction data is defined by a correction function approximated by a second-order Taylor series expansion.

5. The arithmetic processing apparatus according to claim 4, wherein the error of the third distance is calculated so that the second difference becomes smaller for a neighboring pixel in spatiotemporal space with respect to a pixel of interest.

6. The arithmetic processing apparatus according to claim 5, wherein the neighboring pixel is a pixel that has been extracted under a condition that the difference between the second distance before correction for the pixel of interest and the second distance before correction for the neighboring pixel is equal to or less than a predetermined threshold.

7. A distance measuring apparatus comprising:
a light emitting part configured for light emission of first irradiation light of which intensity is modulated by a first modulation signal of a first frequency, and light emission of second irradiation light of which intensity is modulated by a second modulation signal of a second frequency different from the first frequency;

a light receiving part that receives reflected light that is light emitted from the light emitting part and reflected by a measurement object; and an operation processing part that performs processing of calculating a first distance to a measurement object by emitting and receiving first irradiation light, calculating a second distance to the measurement object by emitting and receiving the second irradiation light, calculating a corrected first distance using first correction data that has been acquired, determining whether the corrected first distance is within an error range of the second distance as a third distance using the second distance, determining that the third distance is considered to include an error due to noise, acquiring second correction data for correcting an error of the second distance caused by an error in an intensity change of the second irradiation light with respect to a sine wave of the second frequency, defining a corrected second distance obtained by correcting the second distance using the second correction data, defining a difference between the corrected first distance and the third distance as a first difference, defining a difference between the corrected second distance and the third distance as a second difference, and calculating an error due to the noise so that the first difference and the second difference become smaller.

8. The distance measuring apparatus according to claim 7, further comprising a storage part in which the first correction data is stored.

9. The distance measuring apparatus according to claim 7, wherein the first correction data is data for correcting an error of a measurement distance caused by an error in an intensity change of the first irradiation light with respect to a sine wave of the first frequency.

10. The distance measuring apparatus according to claim 7, wherein the first frequency is set to be higher than the second frequency.

11. The distance measuring apparatus according to claim 7, wherein the second correction data is defined by a correction function approximated by a second-order Taylor series expansion.

12. The distance measuring apparatus according to claim 11, wherein the error of the third distance is calculated so that the second difference becomes smaller for a neighboring pixel in spatiotemporal space with respect to a pixel of interest.

13. The distance measuring apparatus according to claim 12, wherein the neighboring pixel is a pixel that has been extracted under a condition that the difference between the second distance before correction for the pixel of interest and the second distance before correction for the neighboring pixel is equal to or less than a predetermined threshold.

14. An arithmetic processing method performed by an arithmetic processing apparatus, the method comprising:
calculating a first distance to a measurement object by emitting and receiving first irradiation light of which intensity is modulated by a first modulation signal of a first frequency;

calculating a second distance to the measurement object by emitting and receiving second irradiation light of which intensity is modulated by a second modulation signal of a second frequency different from the first frequency;

calculating a corrected first distance using first correction data that has been acquired; and determining whether the corrected first distance is within an error range of the second distance as a third distance using the second distance;

determining that the third distance is considered to include an error due to noise;

acquiring second correction data for correcting an error of the second distance caused by an error in an intensity change of the second irradiation light with respect to a sine wave of the second frequency;

defining a corrected second distance obtained by correcting the second distance using the second correction data;
defining a difference between the corrected first distance and the third distance as a first difference;
defining a difference between the corrected second distance and the third distance as a second difference; and
calculating an error due to the noise so that the first difference and the second difference become smaller.

* * * * *